(12) United States Patent
Laas et al.

(10) Patent No.: US 6,777,523 B1
(45) Date of Patent: *Aug. 17, 2004

US006777523B1

(54) HIGHLY FUNCTIONAL POLYISOCYANATE MIXTURES WHICH ARE DISPERSIBLE IN WATER

(75) Inventors: Hans-Josef Laas, Bergisch Gladbach (DE); Martin Brahm, Odenthal (DE); Reinhard Halpaap, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 77 days.

This patent is subject to a terminal disclaimer.

(21) Appl. No.: 10/148,282

(22) PCT Filed: Nov. 24, 2000

(86) PCT No.: PCT/EP00/11724
§ 371 (c)(1),
(2), (4) Date: May 28, 2002

(87) PCT Pub. No.: WO01/40347
PCT Pub. Date: Jun. 7, 2001

(30) Foreign Application Priority Data

Dec. 2, 1999 (DE) ......................... 199 58 170

(51) Int. Cl.$^7$ .............................. C08G 18/30

(52) U.S. Cl. .................... 528/49; 544/222; 252/182.22; 560/115; 524/591; 524/839

(58) Field of Search .................... 544/222; 252/182.22; 560/115; 528/49; 524/591, 839

(56) References Cited

U.S. PATENT DOCUMENTS

| 4,663,377 A | 5/1987 | Hombach et al. ........... 524/196 |
| 5,252,696 A | 10/1993 | Laas et al. ..................... 528/49 |
| 6,426,414 B1 | 7/2002 | Laas et al. |

FOREIGN PATENT DOCUMENTS

| EP | 0 524 500 | 1/1993 |
| EP | 0 802 210 | 10/1997 |
| EP | 0 835 889 | 4/1998 |

OTHER PUBLICATIONS

Saunders et al.: Polyurethanes: PartI: 1962: p. 343.*

* cited by examiner

*Primary Examiner*—Rachel Gorr
(74) *Attorney, Agent, or Firm*—Joseph C. Gil; Thomas W. Roy; Gary F. Matz

(57) ABSTRACT

The invention relates to polyether-modified, water-dispersible polyisocyanate mixtures, a process for their production and their use as initial component in the production of polyurethane plastics.

12 Claims, No Drawings

HIGHLY FUNCTIONAL POLYISOCYANATE MIXTURES WHICH ARE DISPERSIBLE IN WATER

BACKGROUND OF THE INVENTION

The invention relates to polyether-modified, water-dispersible polyisocyanate mixtures, a process for their production and their use as initial component in the production of polyurethane plastics, in particular as crosslinker for water-soluble or water-dispersible lacquer binding agents or binding-agent components with groups capable of reacting with isocyanate groups.

Against the background of increasing environmental awareness, water-dispersible polyisocyanates have gained in importance in recent years for various fields of application.

Water-dispersible polyisocyanates play a special role nowadays as crosslinker components for water-dilutable two-component polyurethane (2C PUR) lacquers. In combination with aqueous polyol dispersions they permit the formulation of solvent-free lacquer systems that cure already at room temperature to form high-quality coatings which are in no way inferior to conventional lacquers in respect of their resistance to solvents and chemicals or their mechanical load-bearing capacity (cf e.g. EP-A-0 358 979, EP-A-0 469 389, EP-A-0 496 210, EP-A-0 542 105, EP-A-0 543 228, EP-A-0 562 282, EP-A-0 562 436, EP-A-0 583 728, DE-A-4 129 951, DE-A-4 226 242, DE-A-4 226 243 or DE-A-4 226 270).

In addition, water-dispersible polyisocyanate preparations are also important as additives for aqueous dispersion adhesives. With their aid it is possible, for example, for the resistance to heat and the resistance to water of adhesive bonds of different materials to be improved considerably (cf. e.g. EP-A-0 061 628 and EP-A-0 206 059).

Water-dispersible polyisocyanates are used, in addition, as crosslinker components for aqueous dispersions in the finishing of textiles (EP-A-0 560 161 or WO 95/30045) or in formaldehyde-free printing inks for textiles (EP-A-0 571 867 or DE-A-19 533 218) and furthermore are also suitable, for example, as auxiliary agents for the wet strengthening of paper (EP-A-0 564 912, EP-0 582 166, EP-A-0 707 113, WO 96/20309 and WO 97/04169).

In practice, non-ionic polyisocyanates that have been modified with the aid of polyethers to be hydrophilic have gained acceptance for these fields of application. The production of such water-dispersible polyisocyanates is described in a number of publications.

According to the teaching of DE-A-2 415 435, urethanes that are formed from organic, in particular aromatic, polyisocyanates and polyethylene glycol monoalkyl ethers comprising at least 5 ethylene-oxide units, for example, constitute surface-active substances which according to GB-A-1 444 933 and DE-A-2 908 844 enable the production of stable aqueous emulsions of aromatic polyisocyanates.

As a result of conversion with alkylene oxide polyethers, aromatic polyisocyanates that have been modified to be hydrophilic are also known from EP-A-0 061 628 and EP-A-0 095 594. In the form of aqueous emulsions these products are used, in particular, in the field of adhesives.

Water-dispersible preparations of (cyclo)aliphatic polyisocyanates are the subject of EP-A-0 206 059. By way of emulsifiers they contain conversion products that are formed from polyisocyanates with monovalent or polyvalent polyalkylene oxide alcohols, consisting of at least one polyether chain comprising at least 10 ethylene-oxide units, and serve likewise as additives for aqueous adhesives.

EP-0 516 277 describes the hydrophilisation of special polyisocyanates comprising tertiary-bound isocyanate groups by conversion with monovalent polyalkylene oxide polyethers and the use of these products as crosslinker component for aqueous coating agents.

For high-grade, light-fast lacquer applications, in particular the polyisocyanate mixtures that are described in EP-A-0 540 985 and U.S. Pat. No. 5,200,489 and that are obtainable by urethanisation of aliphatic and/or cycloaliphatic lacquer polyisocyanates with short-chain polyethylene oxide polyether alcohols comprising, on statistical average, fewer than 10 ethylene-oxide units have proved their worth.

The water-dispersible polyisocyanates known from EP-A-0 645 410 and EP-A-0 680 983 as crosslinkers for aqueous lacquers for wood and furniture, based on 2,4(6)-diisocyanatotoluene TDI) or mixtures of TDI and 1,6-diisocyanatohexane (HDI), also contain, by way of hydrophilic constituents, urethanes that are formed from polyisocyanate and monofunctional polyethylene oxide polyether alcohols.

In addition to these purely non-ionic, hydrophilised polyisocyanates containing polyether urethanes, polyether-modified water-dispersible polyisocyanates have also been described that comprise in addition, with a view to improving their emulsifiability or with a view to achieving special effects, also ionic groups, for example sulfonate groups (cf. e.g. EP-A-0 703 255) or amino or ammonium groups (cf. e.g. EP-A-0 582 166 and EP-A-0 707 113). Such ionically/non-ionically modified polyisocyanates are, as a rule, less suitable for lacquer applications. They preferably find application in the environmentally friendly finishing of textiles or as wet-strength agents for paper.

Despite their widespread market acceptance for an extremely wide range of applications, the water-dispersible polyisocyanates of the state of the art that have been modified with polyether urethane have a number of basic disadvantages.

Thus water-dispersible polyisocyanates that have been produced using high-molecular-weight polyether alcohols, for example in the case of pure polyethylene oxide polyethers starting from an average molecular weight of about 700, can, by reason of a very high maximum viscosity to be overcome during dispersal, often only be worked into aqueous media homogeneously by applying considerable shear forces (e.g. high-speed stirrers). In addition, such products, particularly in the case of high emulsifier contents such as are required in order to obtain particularly fine-particle dispersions that are stable as regards sedimentation, frequently have a tendency to crystallise.

By using shorter polyether chains, on the other hand, it is possible for water-dispersible polyisocyanates to be obtained that can be stirred into water very easily by hand so as to form stable dispersions and that, even in the case of high degrees of hydophilisation, i.e. with high contents of ethylene-oxide units, show no tendency towards crystallisation whatever. However, by reason of the relatively low molecular weight of the polyalkylene oxide polyethers that are employed for the purpose of modification, with increasing degree of hydrophilisation both the content of isocyanate groups and the average isocyanate functionality steadily diminish. In practice, however, for the majority of the aforementioned fields of application—for example as crosslinker components for lacquers and coatings—highly hydrophilised polyisocyanates to be emulsified in the form of especially fine particles and having high NCO contents and as high a functionality as possible are precisely what are desired.

DE-A-19 822 891 describes, for the first time, a process for producing water-dispersible polyisocyanate mixtures that are not burdened with the disadvantages stated above. In this case, low-monomer polyisocyanates consisting of at least two diisocyanate molecules are converted with monofunctional polyethylene oxide polyether alcohols under allophanation conditions in such a way that at least 60 mol. %, preferably at least 80 mol. %, in particularly preferred manner at least 90 mol. %, of the urethane groups that are formed primarily by NCO/OH reaction continue reacting to form allophanate groups. The resulting polyisocyanate mixtures, which have a degree of allophanation of at least 60 %, can be stirred considerably more easily and in the form of finer particles into aqueous systems, even with clearly lower degrees of hydrophilisation, than water-dispersible polyisocyanates that have been produced using polyether alcohols of like structure in which the polyether chains are linked to the polyisocyanate via urethane bonds. In comparison with the polyisocyanate mixtures known previously, containing polyether chains and with the same or even better dispersibility in water, they are distinguished by a higher content of isocyanate groups and a higher functionality.

As has now been found, polyisocyanate mixtures that have likewise been produced under allophanation conditions from low-monomer polyisocyanates consisting of at least two diisocyanate molecules and from monofunctional polyethylene oxide polyether alcohols exhibit, in comparison with the polyether allophanates described in DE-A-19 822 891, once again a clearly improved dispersibility in water if the allophanation reaction is terminated before a degree of allophanation of 60% is attained. In this way it is possible for water-dispersible polyisocyanate mixtures to be produced that exhibit, in addition to a dispersibility that is improved once again, at the same time the advantage of a higher NCO content and that are suitable for use in all the, aforementioned fields of application of hydrophilic polyisocyanates, in particular as initial components for the production of polyurethane plastics and, above all, as crosslinkers for aqueous binding agents or binding-agent components in coating systems.

Although in some publications having as their subject-matter the production of polyisocyanates containing allophanate groups, for example in EP-A-0 000 194, EP-A-0 303 150, EP-A-0 682 012, U.S. Pat. No. 5,380,792 or U.S. Pat. No. 5,086,175, the conventional polyether alcohols are also named as possible alcoholic initial compounds for the production of such products and, in addition to these, in EP-A-0 000 194, EP-A-0 303 150 and EP-A-0 682 012, within long lists of suitable initial isocyanates, polyisocyanates with a functionality >2, such as, e.g., trimerisation products of HDI or 1-isocyanato-3,3,5-trimethyl-5-isocyanatomethylcyclohexane (IPDI), are also mentioned in all-inclusive manner, a person skilled in the art could not gather from any of the aforementioned publications any concrete indication at all that conversion products of low-monomer polyisocyanates with monofunctional polyethylene oxide polyether alcohols that are produced under allophanation conditions with degrees of allophanation from 20 to 59% can be stirred into water considerably more easily and in the form of finer particles so as to form stable emulsions than can polyisocyanate mixtures having the same gross composition that were produced in accordance with the known processes of the state of the art by urethanisation or in accordance with the process described in DE-A-19 822 891.

SUMMARY OF THE INVENTION

The present invention provides water-dispersible polyisocyanate mixtures based on aliphatic, cycloaliphatic, araliphatic and/or aromatic diisocyanates with a) an average isocyanate functionality of at least 2.0, b) a content of isocyanate groups (reckoned as NCO; molecular weight=42) from 5.0 to 25.0 wt. % and c) a content of ethylene-oxide units bound within polyether chains (reckoned as $C_2H_4O$; molecular weight=44) from 2 to 50 wt. %, whereby the polyether chains contain, on statistical average, 5 to 35 ethylene-oxide units, characterised in that the polyether chains are linked, in a proportion amounting to 20 to 59 mol. %, via allophanate groups to, in each case, two polyisocyanate molecules each synthesised from at least two diisocyanates.

The invention also provides a process for producing these water-dispersible polyisocyanate mixtures, which is characterised in that A) a polyisocyanate component having an (average) NCO functionality from 2.0 to 5.0, a content of aliphatically, cycloaliphatically, araliphatically and/or aromatically bound isocyanate groups (reckoned as NCO; molecular weight=42) from 8.0 to 27.0 wt. % and a content of monomeric diisocyanates of less than 1 wt. % and B) a monovalent polyalkylene oxide polyether alcohol comprising, on statistical average, from 5 to 35 ethylene-oxide units are caused to react with one another, maintaining an NCO/OH equivalent ratio from 6:1 to 400:1, in such a way that 20 to 59% of the urethane groups that are formed primarily by NCO/OH reaction continue reacting to form allophanate groups, whereby in other respects the type and the quantitative ratios of the stated initial compounds are chosen in such a way that the resulting conversion products conform to the conditions stated above under a) to c).

The invention also provides the use of these polyisocyanate mixtures as initial components in the production of polyurethane plastics.

Finally, the invention also provides the use of these polyisocyanate mixtures as crosslinkers for water-soluble or water-dispersible lacquer binding agents or lacquer binding-agent components in the production of coatings by using aqueous coating agents based on such binding agents or binding-agent components.

DETAILED DESCRIPTION OF THE INVENTION

The component A) to be employed in the process according to the invention has an (average) NCO functionality from 2.0 to 5.0, preferably from 2.3 to 4.5, a content of isocyanate groups from 8.0 to 27.0 wt. %, preferably 14.0 to 24.0 wt. %, and a content of monomeric diisocyanates of less than 1 wt. %, preferably less than 0.5 wt. %. It consists of at least one organic polyisocyanate with aliphatically, cycloaliphatically, araliphatically and/or aromatically bound isocyanate groups.

In the case of the polyisocyanates or polyisocyanate mixtures of component A) it is a question of arbitrary polyisocyanates with uretdione, isocyanurate, allophanate, biuret, imino-oxadiazinedione and/or oxadiazinetrione structure that are produced by modification of simple aliphatic, cycloaliphatic, araliphatic and/or aromatic diisocyanates and synthesised from at least two diisocyanates, such as are described by way of examples in, for example, J. Prakt. Chem. 336 (1994) 185–200, DE-A-1 670 666, DE-A-1 954 093, DE-A-2 414 413, DE-A-2 452 532, DE-A-2 641 380, DE-A-3 700 209, DE-A-3 900 053 and DE-A-3 928 503 or EP-A-0 336 205, EP-A-0 339 396 and EP-A-0 798 299.

Suitable diisocyanates for producing such polyisocyanates are arbitrary diisocyanates that are available by phosgenation or in accordance with phosgene-free processes, for example by thermal cleavage of urethane, in the molecular-weight range from 140 to 400 with aliphatically, cycloaliphatically, araliphatically and/or aromatically bound isocyanate groups, such as, e.g., 1,4-diisocyanatobutane, 1,6-diisocyanatohexane (HDI), 2-methyl-1,5-diisocyanatopentane, 1,5diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone diisocyanate IPDI), 4,4'-diisocyanatodicyclohexylmethane, 1-isocyanato-1-methyl-4(3)isocyanatomethylcyclohexane, bis-isocyanatomethyl)-norbornane, 1,3- and 1,4-bis-(2-isocyanato-prop-2-yl)-benzene (TMXDI), 2,4- and 2,6-diisocyanatotoluene (TDI), 2,4'- and 4,4'-diisocyanatodiphenylmethane, 1,5-disocyanatonaphthalene or arbitrary mixtures of such diisocyanates.

In the case of the initial components A) it is preferably a question of polyisocyanates or polyisocyanate mixtures of the stated type with exclusively aliphatically and/or cycloaliphatically bound isocyanate groups.

Quite particularly preferred initial components A) are polyisocyanates or polyisocyanate mixtures with isocyanurate structure on the basis of HDI, IPDI and/or 4,4'-diisocyanatodicyclohexylmethane.

In the case of the component B) it is a question of monovalent polyalkylene oxide polyether alcohols comprising, on statistical average, 5 to 35, preferably 7 to 30, ethylene-oxide units per molecule, such as are available, in a manner known as such, by alkoxylation of suitable starter molecules (see, e.g. Ullmanns Encyclopädie der technischen Chemie, 4$^{th}$ Edition, Volume 19, Verlag Chemie, Weinheim, pp 31–38).

By way of suitable starter molecules for producing the polyether alcohols B) which are employed in the process according to the invention, mention may be made here, by way of examples, of: saturated monoalcohols such as methanol, ethanol, n-propanol, isopropanol, n-butanol, isobutanol, sec. butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane, or tetrahydrofurfuryl alcohol; unsaturated alcohols such as allyl alcohol, 1,1-dimethylallyl alcohol or oleic alcohol, aromatic alcohols such as phenol, the isomeric cresols or methoxyphenols, araliphatic alcohols such as benzyl alcohol, anisic alcohol or cinnamyl alcohol; secondary monoamines such as dimethylamine, diethylamine, dipropylamine, diisopropylamine, dibutylamine, diisobutylamine, bis-(2-ethylhexyl)-amine, N-methyl- and N-ethylcyclohexylamine or dicyclohexylamine as well as heterocyclic secondary amines such as morpholine, pyrrolidone, piperidine or 1H-pyrazole.

Preferred starter molecules are saturated monoalcohols with up to 4 carbon atoms. In particularly preferred manner use is made of methanol by way of starter molecule.

Suitable alkylene oxides for the alkoxylation reaction are, in particular, ethylene oxide and propylene oxide, which can be employed in arbitrary sequence or in a mixture in the course of the alkoxylation reaction.

In the case of the polyalkylene oxide polyether alcohols B) it is a question either of pure polyethylene oxide polyethers or of mixed polyalkylene oxide polyethers, the alkylene-oxide units of which consist, in a proportion amounting to at least 30 mol. %, preferably at least 40 mol. %, of ethylene-oxide units.

Preferred initial components B) for the process according to the invention are pure polyethylene glycol monomethyl ether alcohols which comprise, on statistical average, 7 to 30, in quite particularly preferred manner 7 to 25, ethylene-oxide units.

Optionally, but in less preferred manner, in addition to the stated polyether alcohols B) concomitant use can be made in the process according to the invention, in subordinate quantities, of further compounds that react with isocyanates and that have anionic or cationic groups, for example carboxylate, sulfonate or ammonium groups, as hydrophilic structural components.

With a view to implementing the process according to the invention, the initial components A) and B) are caused to react with one another at temperatures from 40 to 180° C., preferably 50 to 150° C., maintaining an NCO/OH equivalent ratio from 6:1 to 400:1, preferably from 8:1 to 140:1, in such a way that 20 to 59 mol. %, preferably 25 to 59 mol. %, in particularly preferred manner 30 to 59 mol. %, of the urethane groups that are formed primarily by NCO/OH reaction continue reacting to form allophanate groups.

With a view to accelerating the allophanation reaction, in the process according to the invention concomitant use can optionally be made of suitable catalysts. In this connection it is a question of the conventional known allophanation catalysts, for example metal carboxylates, metal chelates or tertiary amines of the type described in GB-A-0 994 890, alkylation agents of the type described in U.S. Pat. No. 3,769,318 or strong acids such as are described by way of examples in EP-A-0 000 194.

Suitable allophanation catalysts are, in particular, zinc compounds such as, e.g., zinc(II) stearate, zinc(II)-n-octanoate, zinc(II)-2-ethyl-1-hexanoate, zinc(II) naphthenate or zinc (II) acetylacetonate, tin compounds such as, e.g., tin(II)-n-octanoate, tin(II)-2-ethyl-1-hexanoate, tin(II) laurate, dibutyltin oxide, dibutyltin dichloride, dibutyltin diacetate, dibutyltin dilaurate, dibutyltin dimaleate or dioctyltin diacetate, aluminium tri(ethylacetoacetate), iron(III) chloride, potassium octoate, manganese compounds, cobalt compounds or nickel compounds, as well as strong acids such as, e.g., trifluoroacetic acid, sulfuric acid, hydrogen chloride, hydrogen bromide, phosphoric acid or perchloric acid, or arbitrary mixtures of these catalysts.

Suitable, albeit less preferred, catalysts for the process according to the invention are also those compounds which, in addition to the allophanation reaction, also catalyse the trimerisation of isocyanate groups subject to the formation of isocyanurate structures. Such catalysts are described in, for example, EP-A-0 649 866, page 4, line 7 to page 5, line 15.

Preferred catalysts for the process according to the invention are zinc compounds of the aforementioned type. Quite particularly preferred is the use of zinc(II)-n-octanoate, zinc(II)-2-ethyl-1-hexanoate and/or zinc(II) stearate.

These catalysts come into action in the process according to the invention, if at all, in a quantity from 0.001 to 5 wt.

%, preferably 0.005 to 1 wt. %, in relation to the total weight of the reaction partners.

The addition to the reaction mixture can be undertaken in this connection by arbitrary methods. Thus it is possible, for example, to admix the catalyst which is optionally to be used concomitantly either to the polyisocyanate component A) and/or to the polyether component B) before the start of the actual conversion. Similarly it is possible to add the catalyst to the reaction mixture at any time during the urethanisation reaction or, in the sense of a two-stage reaction procedure, also subsequent to the urethanisation, i.e. if the NCO content corresponding theoretically to a complete conversion of isocyanate and hydroxyl groups has been attained.

In the process according to the invention the progress of the conversion can be tracked by, e.g., titrimetric determination of the NCO content. After the NCO content being striven for has been attained, preferably if the degree of allophanation, i.e. the percentage—which can be calculated from the NCO content—of the urethane groups that have been converted to allophanate groups and that were formed from polyether alcohol and polyisocyanate, of the reaction mixture amounts to 25 to 59%, in particularly preferred manner 30 to 59%, the reaction is terminated. In the case of purely thermal reaction control this can be effected, for example, by cooling the reaction mixture to room temperature. But in the case of the preferred concomitant use of an allophanation catalyst of the stated type the conversion is generally stopped by addition of suitable catalyst poisons, for example acid chlorides such as benzoyl chloride or isophthaloyl dichloride.

In other respects, in the process according to the invention the type and the quantitative ratios of the initial components within the scope of the stated figures are chosen in such a way that the resulting polyisocyanate mixtures conform to the figures stated above under a) to c), whereby a) the average NCO functionality amounts to preferably 2.2 to 9.0, in particularly preferred manner 2.5 to 5.4, b) the NCO content amounts to preferably 6.0 to 23.0 wt. %, in particularly preferred manner 8.5 to 22.0 wt. %, and c) the content of ethylene-oxide units bound within polyether chains amounts to preferably 5 to 40 wt. %, in particularly preferred manner 7 to 25 wt. %.

The figures that have been stated with respect to the NCO functionality of the products of the process according to the invention relate to the value that can be determined by calculation from the type and functionality of the initial components in accordance with the following formula:

$$F = \frac{\Sigma \text{ equiv. } NCO - \Sigma(1+x) \cdot \text{mol OH}}{\Sigma(\text{equiv. } NCO/f_{NCO}) + \Sigma \text{ mol OH} - \Sigma(1+x) \cdot \text{mol OH}}$$

in which x signifies the proportion of the urethane groups that have been converted into allophanate groups in the process according to the invention. The functionality $f_{NCO}$ of the initial polyisocyanates A) can be calculated from the NCO content and the molecular weight which is determined, for example, by gel permeation chromatography (GPC) or vapour-pressure osmosis.

The process according to the invention can optionally be carried out in a suitable solvent that is inert in relation to isocyanate groups. Suitable solvents are, for example, the conventional lacquer solvents known as such, such as, e.g., ethyl acetate, butyl acetate, ethylene glycol monomethyl ether acetate or ethylene. glycol ethyl ether acetate, 1-methoxypropyl-2-acetate, 3-methoxy-n-butyl acetate, acetone, 2-butanone, 4-methyl-2-pentanone, cyclohexanone, toluene, xylene, chlorobenzene, white spirit, higher-substituted aromatics such as are on the market under the names Solventnaphtha®, Solvesso®, Shellsol®, Isopar®, Nappar® and Diasol®, carbonic esters such as dimethyl carbonate, diethyl carbonate, 1,2-ethylene carbonate and 1,2-propylene carbonate, lactones such as β-propiolactone, γ-butyrolactone, ε-caprolactone and ε-methylcaprolactone, but also solvents such as propylene glycol diacetate, diethylene glycol dimethyl ether, dipropylene glycol dimethyl ether, diethylene glycol ethyl ether acetate and diethylene glycol butyl ether acetate, N-methylpyrrolidone and N-methylcaprolactam, or arbitrary mixtures of such solvents.

The products of the process according to the invention constitute clear, practically colourless polyisocyanate mixtures having the composition already stated above, which can easily be dispersed in water by mere stirring without using high shear forces, whereby, with a view to obtaining aqueous dispersions that are stable as regards sedimentation in the case of a given composition and molecular-weight distribution of the polyether segments, a considerably lower total content of ethylene-oxide units than in the case of water-dispersible polyisocyanate mixtures pertaining to the state of the art that have been produced by urethanisation with polyether alcohols having the same composition and molecular-weight distribution is already sufficient. The process according to the invention thus permits the production of highly hydrophilic polyisocyanates that are stable as regards crystallisation and that, in comparison with the polyisocyanate mixtures known hitherto containing polyether urethanes, with the same or even better dispersibility in water, are distinguished by a higher content of isocyanate groups and a higher functionality. Also in comparison with the allophanate-modified polyisocyanate mixtures described in DE-A-19 822 891 with degrees of allophanation of at least 60%, the products of the process according to the invention have, with the same polyether content, besides a dispersibility that is improved once again, the advantage of a higher NCO content.

The outstanding dispersibility already with low ethyloxide contents in compounds with high NCO contents and functionalities constitutes an advantage, particularly for the use of the polyisocyanate mixtures according to the invention in aqueous 2C PUR lacquers, since in this way highly cross-linked coatings can be obtained that exhibit, in addition to very good resistance to solvents and chemicals, in particular excellent resistance to water by reason of the low content of hydrophilic groups.

Prior to emulsification, further non-hydrophilised polyisocyanates, in particular lacquer polyisocyanates of the aforementioned type, can optionally be added to the polyisocyanate mixtures produced by the process according to the invention, the quantitative ratios preferably being chosen in such a way that the resulting polyisocyanate mixtures conform to the conditions stated above under a) to c) and consequently likewise constitute polyisocyanate mixtures according to the invention, since the latter generally consist of mixtures of (i) polyisocyanates that have been modified to be hydrophilic in accordance with the invention and
(ii) unmodified polyisocyanates of the type stated by way of example.

In such mixtures the products of the process according to the invention perform the function of an emulsifier for the portion of non-hydrophilic polyisocyanates that is admixed subsequently.

The polyisocyanate mixtures according to the invention constitute valuable initial materials for the production of polyurethane plastics by the isocyanate polyaddition process.

For this purpose the polyisocyanate mixtures are preferably employed in the form of aqueous emulsions which, in combination with polyhydroxyl compounds dispersed in water, can be caused to react in the sense of aqueous two-component systems.

In particularly preferred manner the polyisocyanate mixtures according to the invention are used as crosslinkers for lacquer binding agents or binding-agent components dissolved or dispersed in water with groups capable of reacting with isocyanate groups, in particular alcoholic hydroxyl groups, in the production of coatings by using aqueous coating agents based on such binding agents or binding-agent components. In this connection the crosslinker, optionally in emulsified form, can be combined with, the binding agents or binding-agent components by simple stirring prior to processing of the coating agents by arbitrary methods or by using two-component spray guns.

In this context, by way of lacquer binding agents or lacquer binding-agent components mention may be made, by way of examples, of: polyacrylates dissolved or dispersed in water and comprising hydroxyl groups, in particular those within the molecular-weight range from 1,000 to 10,000, which, with organic polyisocyanates as crosslinkers, constitute valuable two-component binding agents, or polyester resins dispersed in water, optionally urethane-modified, comprising hydroxyl groups, of the type known from polyester chemistry and alkyd-resin chemistry. Suitable in principle by way of reaction partners for the polyisocyanate mixtures according to the invention are all binding agents dissolved or dispersed in water comprising groups that react with isocyanates. These also include, for example, polyurethanes or polyureas dispersed in water that are capable of cross-linking with polyisocyanates by reason of the active hydrogen atoms that are present in the urethane or urea groups.

In the case of the use according to the invention as crosslinker component for aqueous lacquer binding agents the polyisocyanate mixtures according to the invention are generally employed in quantities that correspond to an equivalent ratio of NCO groups to groups capable of reacting with NCO groups, in particular alcoholic hydroxyl groups, from 0.5:1 to 2:1.

The polyisocyanate mixtures according to the invention can optionally also be admixed, in subordinate quantities, to non-functional aqueous lacquer binding agents with a view to achieving quite special properties, for example as an additive for the purpose of improving the adhesion.

The polyisocyanate mixtures according to the invention can of course also be employed in blocked form with blocking agents known as such from polyurethane chemistry in combination with the aforementioned aqueous lacquer binding agents or lacquer binding-agent components in the sense of aqueous one-component PUR stoving systems. Suitable blocking agents are, for example, diethyl malonate, acetoacetic ester, acetone oxime, butanone oxime, ε-caprolactam, 3,5-dimethylpyrazole, 1,2,4-triazole, dimethyl-1,2,4-triazole, imidazole or arbitrary mixtures of these blocking agents.

By way of undersurfaces for the aqueous coatings that are formulated with the aid of the polyisocyanate mixtures according to the invention, arbitrary substrates enter into consideration such as, e.g., metal, wood, glass, stone, ceramic materials, concrete, hard and flexible plastics, textiles, leather and paper, which may optionally also be provided with conventional primers prior to coating.

In general, the aqueous coating agents that are formulated with the polyisocyanate mixtures according to the invention, into which the auxiliary substances and additives that are conventional in the lacquering industry, such as, e.g., flow-control agents, coloured pigments, fillers, flatting agents or emulsifiers, can optionally be incorporated, possess good lacquer properties already in the case of drying at room temperature.

However, they can of course also be dried under forced conditions at elevated temperature or by stoving at temperatures up to 260° C.

By reason of their outstanding emulsifiability in water, which enables a homogeneous, particularly fine-particle distribution in aqueous lacquer binding agents, the use of the polyisocyanate mixtures according to the invention as crosslinker component for aqueous polyurethane lacquers results in coatings with outstanding optical properties, in particular with high surface gloss, flow and high transparency.

In addition to the preferred use as crosslinker components for aqueous 2C PUR lacquers, the polyisocyanate mixtures according to the invention are outstandingly suitable as crosslinkers for aqueous dispersion adhesives, leather and textile coatings or printing pastes for textiles, as AOX-free paper-making aids or as additives for mineral building materials, for example concrete compositions or mortar compositions.

The following examples serve for further elucidation of the invention. The expression "degree of allophanation" designates the percentage—which can be calculated from the NCO content—of the urethane groups that have been converted into allophanate groups and that have been formed from polyether alcohol and polyisocyanate. All other percentage figures refer to the weight.

EXAMPLES

Example 1

850 g (4.39 equiv.) of a polyisocyanate containing isocyanurate groups and based on 1,6-diisocyanatohexane (HDI) with an NCO content of 21.7%, an average NCO functionality of 3.5 (according to GPC), a content of monomeric HDI of 0.1% and a viscosity of 3,000 mPa.s (23° C.) are submitted at 100° C. under dry nitrogen and subject to stirring, are added within 30 min to 150 g (0.30 equiv.) of a monofunctional polyethylene oxide polyether which was started on methanol, with an average molecular weight of 500, corresponding to an NCO/OH equivalent ratio of 14.6:1, and are subsequently stirred further at this temperature until the NCO content of the mixture after approximately 2 h has fallen to the value of 17.2% corresponding to complete urethanisation. The allophanation reaction is started by addition of 0.01 g zinc(II)-2-ethyl-1-hexanoate. In the process the temperature of the reaction mixture rises to 103° C. by reason of the liberated heat of reaction. The progress of the reaction is tracked by NCO titration. After an NCO content of 16.7% has been attained, the reaction is terminated by addition of 0.01 g benzoyl chloride and the reaction mixture is cooled to room temperature. A practically colourless, clear polyisocyanate mixture according to the invention is present having the following characteristic data:

| | |
|---|---|
| solids content: | 100% |
| NCO content: | 16.6% |
| NCO functionality: | 3.6 |

-continued

| | |
|---|---|
| viscosity (23° C.): | 6,300 mPa.s |
| ethylene-oxide content: | 14.0% |
| degree of allophanation: | 46% |

Example 2

850 g (4.39 equiv.) of the polyisocyanate containing isocyanurate groups and based on HDI that was described in Example 1 are submitted at 100° C. under dry nitrogen and subject to stirring, are added within 30 min to 150 g (0.30 equiv.) of the polyether alcohol described in Example 1, corresponding to an NCO/OH equivalent ratio of 14.6:1, and are subsequently stirred further at this temperature until the NCO content of the mixture after approximately 2 h has fallen to the value of 17.2% corresponding to complete urethanisation. The allophanation reaction is started by addition of 0.01 g zinc(II)-2-ethyl-1-hexanoate. In the process the temperature of the reaction mixture rises to 105° C. by reason of the liberated heat of reaction. The progress of the reaction is tracked by NCO titration. After an NCO content of 16.9% has been attained, the reaction is terminated by addition of 0.01 g benzoyl chloride and the reaction mixture is cooled to room temperature. A practically colourless, clear polyisocyanate mixture according to the invention is present having the following characteristic data:

| | |
|---|---|
| solids content: | 100% |
| NCO content: | 16.8% |
| NCO functionality: | 3.5 |
| viscosity (23° C.): | 4,800 mPa.s |
| ethylene-oxide content: | 14.0% |
| degree of allophanation: | 31% |

Example 3

830 g (4.58 equiv.) of a polyisocyanate containing isocyanurate groups and based on HDI with an NCO content of 23.2%, an average NCO functionality of 3.2 (according to GPC), a content of monomeric HDI of 0.2% and a viscosity of 1,200 mPa.s (23° C.) are submitted at 100° C. under dry nitrogen and subject to stirring, are added within 30 min to 170 g (0.49 equiv.) of a monofunctional polyethylene oxide polyether which was started on methanol, with an average molecular weight of 350, corresponding to an NCO/OH equivalent ratio of 9.3:1, and are subsequently stirred further at this temperature until the NCO content of the mixture after approximately 2 h has fallen to the value of 17.2% corresponding to complete urethanisation. The allophanation reaction is started by addition of 0.01 g zinc(II)-2-ethyl-1-hexanoate. In the process the temperature of the reaction mixture rises to 108° C. by reason of the liberated beat of reaction. The progress of the reaction is tracked by NCO titration. After an NCO content of 16.5% has been attained, the reaction is terminated by addition of 0.01 g benzoyl chloride and the reaction mixture is cooled to room temperature. A practically colourless, clear polyisocyanate mixture according to the invention is present having the following characteristic data:

| | |
|---|---|
| solids content: | 100% |
| NCO content: | 16.3% |
| NCO functionality: | 3.2 |
| viscosity (23° C.): | 2,400 mPa.s |
| ethylene-oxide content: | 15.4% |
| degree of allophanation: | 43% |

Example 4

(comparison according to DE-A-19 822 891)

850 g (4.39 equiv.) of the polyisocyanate containing isocyanurate groups and based on HDI that was described in Example 1 are submitted at 100° C. under dry nitrogen and subject to stirring, are added within 30 min to 150 g (0.30 equiv.) of the polyether alcohol described in Example 1 and are subsequently stirred further at this temperature until the NCO content of the mixture after approximately 2 h has fallen to the value of 17.2% corresponding to complete urethanisation. The allophanation reaction is started by addition of 0.01 g zinc(II)-2-ethyl-1-hexanoate. In the process the temperature of the reaction mixture rises to 104° C. by reason of the liberated heat of reaction. After the exothermal reaction has died down, approximately 30 min after addition of catalyst, the reaction is terminated by addition of 0.01 g benzoyl chloride and the reaction mixture is cooled to room temperature. A practically colourless, clear polyisocyanate mixture is present having the following characteristic data:

| | |
|---|---|
| solids content: | 100% |
| NCO content: | 16.0% |
| NCO functionality: | 3.9 |
| viscosity (23° C.): | 7,400 mPa.s |
| ethylene-oxide content: | 14.0% |
| degree of allophanation: | 92% |

Example 5

(comparison according to EP-A-0 206 059)

850 g (4.39 equiv.) of the polyisocyanate containing isocyanurate groups and based on HDI that was described in Example 1 are submitted at 100° C. under dry nitrogen and subject to stirring, are added within 30 min to 150 g (0.30 equiv.) of the polyether alcohol described in Example 1 and are stirred further at this temperature until the NCO content of the mixture after approximately 2 h has fallen to the value of 17.2% corresponding to complete urethanisation. After cooling to room temperature, a colourless, clear polyisocyanate mixture is present having the following characteristic data:

| | |
|---|---|
| solids content: | 100% |
| NCO content: | 17.2% |
| NCO functionality: | 3.3 |
| viscosity (23° C.): | 3,600 mPa.s |
| ethylene-oxide content: | 14.0% |
| degree of allophanation: | 0% |

Example 6

(comparison according to EP-A-0 206 059)

800 g (4.13 equiv.) of the polyisocyanate containing isocyanurate groups and based on HDI that was described in Example 1 are submitted at 100° C. under dry nitrogen and subject to stirring, are added within 30 min to 200 g (0.40 equiv.) of the polyether alcohol described in Example 1 and are stirred further at this temperature until the NCO content of the mixture after approximately 2 h has fallen to the value of 15.7% corresponding to complete urethanisation. After cooling to room temperature, a colourless, clear polyisocyanate mixture is present having the following characteristic data:

| | |
|---|---|
| solids content: | 100% |
| NCO content: | 15.7% |
| NCO functionality: | 3.2 |
| viscosity (23° C.): | 3,700 mPa.s |
| ethylene-oxide content: | 18.7% |
| (degree of allophanation: | 0% |

Example 7

(comparison according to DE-A-19 822 891)

830 g (4.58 equiv.) of the polyisocyanate containing isocyanurate groups and based on HDI that was described in Example 3 are submitted at 100° C. under dry nitrogen and subject to stirring, are added within 30 min to 170 g (0.49 equiv.) of the polyether alcohol described in Example 3 and are subsequently stirred further at this temperature until the NCO content of the mixture after approximately 2 h has fallen to the value of 17.2% corresponding to complete urethanisation. The allophanation reaction is started by addition of 0.01 g zinc(II)-2-ethyl-1-hexanoate. In the process the temperature of the reaction mixture rises to 108° C. by reason of the liberated heat of reaction. After the exothermal reaction has died down, approximately 20 min after addition of catalyst, the reaction is terminated by addition of 0.01 g benzoyl chloride and the reaction mixture is cooled to room temperature. A colourless, clear polyisocyanate mixture is present having the following characteristic data:

| | |
|---|---|
| solids content: | 100% |
| NCO content: | 15.2% |
| NCO functionality: | 3.8 |
| viscosity (23° C.): | 2,900 mPa.s |
| ethylene-oxide content: | 15.4% |
| degree of allophanation: | 95% |

Example 8

(comparison according to EP-A-0 540 985)

830 g (4.58 equiv.) of the polyisocyanate containing isocyanurate groups and based on HDI that was described in Example 3 are submitted at 100° C. under dry nitrogen and subject to stirring, are added within 30 min to 170 g (0.49 equiv.) of the polyether alcohol described in Example 3 and are subsequently stirred further at this temperature until the NCO content of the mixture after approximately 2 h has fallen to the value of 17.2% corresponding to complete urethanisation. After cooling to room temperature a colourless, clear polyisocyanate mixture is present having the following characteristic data:

| | |
|---|---|
| solids content: | 100% |
| NCO content: | 17.2% |
| NCO functionality: | 2.9 |
| viscosity (23° C.): | 1,600 mPa.s |
| ethylene-oxide content: | 15.4% |
| degree of allophanation: | 0% |

Example 9

(production of emulsions)

In each instance 28 g of the polyisocyanate mixtures according to the invention from Examples 1, 2 and 3 as well as the reference polyisocyanates from Examples 4, 5, 6 and 7 were diluted with, in each instance, 12 g 1-methoxypropyl-2-acetate, were added to 100 g de-ionized water in an Erlenmeyer flask and were subsequently stirred, in each instance for 1 min, with the aid of a magnetic stirrer at 900 rpm. As a measure of the dispersibility of the different polyisocyanate mixtures, the average particle size of the emulsions that were formed was determined with the aid of a "Zetasizer" instrument manufactured by Malvern Instruments. The following table shows the values that were found.

| Polyisocyanate mixture from | Degree of allophanation [%] | Average particle size [nm] |
|---|---|---|
| Example 1 | 46 | 75 |
| Example 2 | 31 | 83 |
| Example 4 (reference) | 92 | 174 |
| Example 5 (reference) | 0 | 434 |
| Example 6 (reference) | 0 | 88 |
| Example 3 | 43 | 118 |
| Example 7 (reference) | 95 | 169 |
| Example 8 (reference) | 0 | 696 |

The comparison shows that, in comparison with polyisocyanate mixtures of the same gross composition that were produced in accordance with DE-A-19 822 891 with a higher degree of allophanation (Examples 4 and 7) and polyisocyanate mixtures of the same gross composition that were produced according to the teaching of EP-A-0 206 059 (Example 5) and EP-A-0 540 985 (Example 8), in which the polyether chains are linked to the polyisocyanate exclusively via urethane bonds, the polyisocyanate mixtures that were produced in accordance with the invention (Examples 1 and 2 and 3) exhibit clearly better dispersibility. In order to attain a similarly good dispersibility, polyurethane-modified polyisocyanate mixtures according to EP-A-0 206 059 (Example 6) require a considerably higher total content of ethylene-oxide units in comparison with the polyisocyanate mixtures according to the invention (Examples 1 and 2).

Example 10

(use)

100 parts by weight of an aqueous, cosolvent-free, hydroxyfunctional polyacrylate dispersion with a solids content of 43% and an OH content of 2.5%, in relation to solid resin, consisting substantially of 48.0% methyl methacrylate, 27.4% n-butyl acrylate, 21.6% hydroxy-$C_3$-alkyl methacrylate (addition product of propylene oxide on methacrylic acid) and 3.0% acrylic acid, were mixed with 0.5 parts by weight of a commercial defoamer (Foamaster® TCX, Henkel). To this charge there were added 16.0 parts by weight of the polyisocyanate according to the invention from Example 1 (corresponding to an equivalent ratio of isocyanate groups to alcoholic hydroxyl groups of 1:1), and the mixture was homogenised by intense stirring (2,000 rpm). Subsequently the solids content was adjusted to 40% by addition of water.

For the purpose of comparison, clear lacquers were produced in accordance with the same process from, in each instance, 100 parts by weight of the hydroxyfunctional polyacrylate dispersion described above and 16.6 parts by weight of the polyisocyanate according to DE-A-198 22 891 from Example 4 and 15.5 parts by weight of the polyisocyanate according to EP-A-0 206 059 from Example 5 (in each instance corresponding to an equivalent ratio of isocyanate groups to alcoholic hydroxyl groups of 1:1).

The processing-time of the ready-to-apply charges amounted in all cases to about 3 hours. The lacquers were applied onto glass plates in a wet-film layer thickness of 150 μm (about 60 μm dry) and dried after 15-minutes exposure to the air under forced conditions (30 min/60° C.). Lacquer films were obtained having the following properties:

| Polyisocyanate from | Example 1 | Example 4 (comparison) | Example 5 (comparison) |
|---|---|---|---|
| gloss 20° | 86 | 85 | 75 |
| gloss, visual[a)] | 0 | 1 | 3 |
| haze | 22 | 57 | 147 |
| pendulum hardness [s] acc. to 1 d/7 d[b)] | 99/137 | 106/139 | 84/125 |
| resistance to solvents[c)] | | | |
| water (30 min.) | 0 | 0 | 2 |
| isopropanol/water 1:1 (1 min.) | 0 | 0 | 2 |
| MPA/xylene 1:1 (1 min.) | 0 | 0 | 2 |
| butyl glycol (1 min.) | 0 | 0 | 2 |
| acetone (1 min.) | 0 | 0 | 3 |

[a)]assessment: 0 (very good)–5 (poor)
[b)]pendulum hardness acc. to König (DIN 53157)
[c)]assessment: 0–5 (0 = lacquer film unchanged; 5 = totally dissolved)

The comparison shows that with the aid of the polyisocyanate mixture produced in accordance with the invention (Example 1) a coating is obtained that, in comparison with a lacquer film produced by using the polyisocyanate mixture with a higher degree of allophanation according to DE-A-19 822 891 (Example 4), is distinguished by a lower haze by reason of the better emulsifiability and, in comparison with a lacquer film obtained by using the polyisocyanate mixture according to EP-A-0 206 059 (Example 5), furthermore also exhibits a considerably higher resistance to solvents and to water.

What is claimed is:

1. A water-dispersible polyisocyanate mixture prepared from an aliphatic, cycloaliphatic, araliphatic and/or aromatic diisocyanate and having
    a) an average isocyanate functionality of at least 2.0,
    b) a content of 5.0 to 25.0 wt. %, based on resin solids, of isocyanate groups (calculated as NCO; molecular weight=42) and
    c) a content of 2 to 50 wt. %, based on resin solids, of ethylene oxide (calculated as $C_2H_4O$; molecular weight=44) units incorporated within polyether chains, containing an average of 5 to 35 ethylene oxide units, wherein 20 to 59 mol. % of the polyether chains are connected via allophanate groups to two polyisocyanate molecules which are each prepared from at least two diisocyanate molecules.

2. A water-dispersible polyisocyanate mixture prepared from an aliphatic and/or cycloaliphatic diisocyanates with
    a) an average isocyanate functionality from 2.2 to 9.9,
    b) a content of 6.0 to 23.0 wt. %, based on resin solids, of isocyanate groups (calculated as NCO; molecular weight=42) and
    c) a content of 5 to 40 wt. % ethylene oxide units bound within polyether chains (calculated as $C_2H_4O$; molecular weight=44) containing an average of 7 to 30 ethylene oxide units, wherein 20 to 59 mol. % of the polyether chains are linked, via allophanate groups to two polyisocyanate molecules each prepared from at least two diisocyanates.

3. The water-dispersible polyisocyanate mixture of claim 1, wherein the polyisocyanate molecules each containing an isocyanurate group.

4. The water-dispersible polyisocyanate mixture of claim 1, wherein the polyisocyanate molecules each contain an isocyanate group and have exclusively aliphatically and/or cycloaliphatically bound isocyanate groups.

5. A process for producing a water-dispersible polyisocyanate mixture having
    a) an average isocyanate functionality from 2.2 to 9.9,
    b) a content of 6.0 to 23.0 wt. %, of isocyanate groups (calculated as NCO; molecular weight=42) and
    c) a content of 5 to 40 wt. %, based on resin solids, ethylene oxide units bound within polyether chains (calculated as $C_2H_4O$; molecular weight=44) containing on average 7 to 30 ethylene oxide units, which comprises reacting
        A) a polyisocyanate component having an average functionality from 2.0 to 5.0, a content of 8.0 to 27.0 wt. %, based on resin solids, of aliphatically, cycloaliphatically, araliphatically and/or aromatically bound isocyanate groups (calculated as NCO; molecular weight=42) and a content of monomeric diisocyanates of less than 1 wt. % with
        B) a monovalent polyalkylene oxide polyether alcohol containing an average of 5 to 35 ethylene oxide units at an NCO/OH equivalent ratio from 6:1 to 400:1, such that 20 to 59% of the urethane groups formed by NCO/OH reaction continue reacting to form allophanate groups.

6. The process of claim 5, wherein
    A) the polyisocyanate component has an average functionality from 2.3 to 4.5, a content of aliphatically and/or cycloaliphatically bound isocyanate groups (calculated as NCO; molecular weight=42) from 14.0 to 24.0 wt. % and a content of monomeric diisocyanates of less than 0.5 wt. % and
    B) the monovalent polyalkylene oxide polyether alcohol contains an statistical average of 7 to 30 ethylene oxide units and the reaction is conducted at an NCO/OH equivalent ratio from 8:1 to 140:1.

7. The process of claim 5, wherein polyisocyanate component A) contains isocyanurate groups and is prepared from 1,6-diisocyanatohexane, 1-isocyanato-3,3,5-trimethyl-5-isocyanatomethylcyclohexane and/or 4,4'-diisocyanatodicyclohexylmethane.

8. The process of claim 5, wherein the conversion is carried out in the presence of a catalyst accelerating the formation of allophanate groups.

9. The process of claim 8, wherein the catalyst is an organic zinc compound.

10. The process of claim 8, wherein the catalyst is zinc(II)-n-octoate, zinc(II)-2-ethyl-1-hexanoate and/or zinc (II) stearate.

11. A polyurethane prepared from a water-dispersible polyisocyanate mixture prepared from an aliphatic, cycloaliphatic, araliphatic and/or aromatic diisocyanate having a) an average isocyanate functionality of at least 2.0, b) a content of 5.0 to 25.0 wt. %, based on resin solids, of isocyanate groups (calculated as NCO; molecular weight=42) and c) a content of 2 to 50 wt. %, based on resin solids, of ethylene oxide units incorporated within polyether chains (calculated as $C_2H_4O$; molecular weight=44), containing an average of 5 to 35 ethylene oxide units, wherein 20 to 59 mol. % of the polyether chains are connected via allophanate groups to two polyisocyanate molecules which are each prepared from at least two diisocyanate molecules.

12. A crosslinker component for water-soluble or water-dispersible binders or binder components in the production of coatings comprising prepared from a water-dispersible polyisocyanate mixture prepared from an aliphatic, cycloaliphatic, araliphatic and/or aromatic diisocyanate having a) an average isocyanate functionality of at least 2.0, b) a content of 5.0 to 25.0 wt. %, based on resin solids, of isocyanate groups (calculated as NCO; molecular weight=42) and c) a content of 2 to 50 wt. %, based on resin solids, of ethylene oxide units incorporated within polyether chains (calculated as $C_2H_4O$; molecular weight=44), containing an average of 5 to 35 ethylene oxide units, wherein 20 to 59 mol. % of the polyether chains are connected via allophanate groups to two polyisocyanate molecules which are each prepared from at least two diisocyanate molecules.

* * * * *